United States Patent
Barzik et al.

(10) Patent No.: US 10,169,594 B1
(45) Date of Patent: Jan. 1, 2019

(54) NETWORK SECURITY FOR DATA STORAGE SYSTEMS

(71) Applicant: International Business Machines Corporation, Armonk, NY (US)

(72) Inventors: Zah Barzik, Rishon LeZion (IL); Maxim Kalaev, Petach Tikva (IL); Alexander Snast, Rishon LeZion (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/716,870

(22) Filed: Sep. 27, 2017

Related U.S. Application Data

(63) Continuation of application No. 15/616,189, filed on Jun. 7, 2017.

(51) Int. Cl.
*G06F 21/00* (2013.01)
*G06F 21/60* (2013.01)
(Continued)

(52) U.S. Cl.
CPC .......... *G06F 21/604* (2013.01); *G06F 3/0653* (2013.01); *G06F 21/6218* (2013.01); *H04L 63/0263* (2013.01); *H04L 63/061* (2013.01)

(58) Field of Classification Search
CPC .. G06F 21/604; G06F 3/0653; G06F 21/6218; H04L 63/0263; H04L 63/061
See application file for complete search history.

(56) References Cited

U.S. PATENT DOCUMENTS

| | | |
|---|---|---|
| 6,745,333 B1 | 6/2004 | Thomsen |
| 2005/0198523 A1 | 9/2005 | Shanbhag et al. |

(Continued)

FOREIGN PATENT DOCUMENTS

| | | |
|---|---|---|
| EP | 2608011 A1 | 6/2013 |
| WO | 2006002126 A2 | 1/2006 |
| WO | 2013095921 A1 | 6/2013 |

OTHER PUBLICATIONS

Yang, Qing, "On Performance of Parallel iSCSI Protocol for Networked Storage Sytems", Proceedings of the 20th International Conference on Advanced Information Networking and Applications (AINA '06), 1550-445x/06 © 2006 IEEE, IEEE Computer Society, 6 pages.

(Continued)

*Primary Examiner* — John B King
(74) *Attorney, Agent, or Firm* — David S. Richart; William H. Hartwell

(57) ABSTRACT

In one embodiment of the present invention, a server is created, and a computer readable storage media is included in the server. An adapter is connected to the server, a set of packets is received by the adapter from a network, and the network and a repository are interfaced by the adapter. A firmware is stored on the adapter, and the adapter is controlled by the firmware. A management component is stored on the computer readable storage media, and the server is managed by the management component. A driver is stored on the management component, and the driver communicates with the adapter. A set of filters that controls transmission of the set of packets is created, and each filter in the set of filters has a set of filter rules. The set of filters is stored on the server.

1 Claim, 3 Drawing Sheets

(51) Int. Cl.
  *H04L 29/06* (2006.01)
  *G06F 21/62* (2013.01)
  *G06F 3/06* (2006.01)

(56) References Cited

U.S. PATENT DOCUMENTS

| | | |
|---|---|---|
| 2005/0240986 A1 | 10/2005 | Yamamoto et al. |
| 2006/0206300 A1 | 9/2006 | Garg et al. |
| 2008/0301759 A1 | 12/2008 | Rivers et al. |
| 2011/0088082 A1 | 4/2011 | Locker et al. |
| 2013/0318255 A1 | 11/2013 | Karino |
| 2014/0289864 A1* | 9/2014 | Dimitrakos ............. G06F 21/53 726/26 |
| 2016/0246632 A1 | 8/2016 | Tsirkin |
| 2017/0126563 A1 | 5/2017 | Nanda et al. |

OTHER PUBLICATIONS

Barzik et al., "Network Security for Data Storage Systems", U.S. Appl. No. 15/616,189, filed Jun. 7, 2017, 26 pages
IBM Appendix P, list of patents and patent applications treated as related, filed herewith, 2 pages.

* cited by examiner

NETWORK SECURITY FOR DATA STORAGE SYSTEMS

BACKGROUND OF THE INVENTION

The present invention relates generally to the field of data storage systems, and more particularly to network security in data storage systems.

Computer data storage, often called storage or memory, is a technology consisting of computer components and recording media used to retain digital data. It is a core function and fundamental component of computers.

The central processing unit (CPU) of a computer is what manipulates data by performing computations. In practice, almost all computers use a storage hierarchy, which puts fast, expensive, small storage options close to the CPU and slower but larger and cheaper options farther away. Generally, the fast volatile technologies (which lose data when off power) are referred to as "memory", while slower persistent technologies are referred to as "storage"; however, "memory" is sometimes also used when referring to persistent storage.

Internet Small Computer System Interface (iSCSI) is a Transmission Control Protocol/Internet Protocol (TCP/IP) based protocol for establishing and managing connections between IP-based storage devices, hosts, and clients. The iSCSI protocol describes a transport protocol for SCSI, which operates on top of TCP and provides a mechanism for encapsulating SCSI commands in an IP infrastructure. The iSCSI protocol is employed for data storage systems that have a TCP/IP infrastructure.

SUMMARY

In one embodiment of the present invention, a server is created, and a computer readable storage media is included in the server. An adapter is connected to the server, a set of packets is received by the adapter from a network, and the network and a repository are interfaced by the adapter. A firmware is stored on the adapter, and the adapter is controlled by the firmware. A management component is stored on the computer readable storage media, and the server is managed by the management component. A driver is stored on the management component, and the driver communicates with the adapter. A set of filters that controls transmission of the set of packets is created, and each filter in the set of filters has a set of filter rules. The set of filters is stored on the server.

DETAILED DESCRIPTION

The present invention describes methods for a storage system to allow remote support connectivity while securing the data center from external attacks by abusing access granted to the storage system. A remote support channel is often supported on storage systems for maintainability, debugging and recoveries. Support operations may require privileged access to the storage system. This privileged access to the storage system can be abused to invoke an attack on the data center on which the storage system in installed. This creates a need to protect the data center from the storage system, as it may be a security vulnerability for other hosts on the data center.

Embodiments of the present invention recognize that a storage system provides services to hosts and clients through various protocols, including iSCSI or other Ethernet based communication protocols. A storage system may be connected to one or more clients through a network that is accessible in the local data center. A storage system may be connected to network ports for management or for remote serviceability and support. Further, a storage system may require a privileged access permission to access the system through a support network. For example, third party developers or engineers may have privileged access to service (e.g., debug) a storage system through an external access over a set of support connections.

Embodiments of the present invention recognize that privileged access to a storage system by a third party creates a security risk to the data center on which the storage system resides. Embodiments of the present invention recognize that a storage system providing security of a data center against traffic with privileged access to the storage system, i.e., protecting the data center's internal network from attacks utilizing access to the storage system, is a problem that is not addressed by current security approaches (e.g., a firewall). Embodiments of the present invention recognize that the importance of the issue of monitoring storage system traffic from the host side is rising at least because of an increase in the popularity of iSCSI or other Ethernet based protocols.

Embodiments of the present invention provide for restricting outbound traffic from the storage system through communication protocols (e.g., TCP/IP over Ethernet) in a manner that prevents a user on the storage system from overriding the restrictions or that makes such an attempt harder and simpler to detect.

The descriptions of the various instances, scenarios, and examples related to the present invention are presented for purposes of illustration and are not intended to be exhaustive or limited to the embodiments disclosed.

Figure 1:
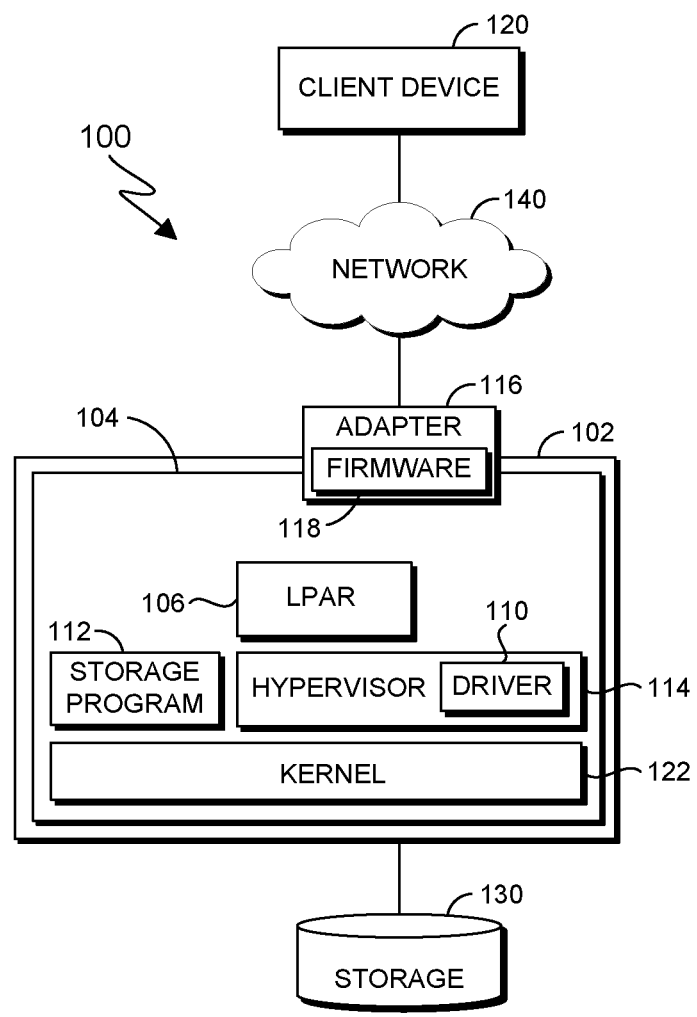
FIG. 1 illustrates a networked computing environment, in accordance with an embodiment of the present invention.

The present invention will now be described in detail with reference to the Figures. FIG. 1 is a functional block diagram illustrating computing environment 100 in accordance with an embodiment of the present invention. FIG. 1 provides only an illustration of one implementation and does not imply any limitations with regard to the environments in which different embodiments may be implemented. Some modifications to the depicted environment may be made by those skilled in the art without departing from the scope of the invention as recited by the claims. In some embodiments, computing environment 100 includes server device 102, client device 120, network 140, and storage 130.

In some embodiments, server device 102, client device 120, and storage 130 are interconnected and communicate through network 140. In some embodiments, network 140 can be a local area network (LAN), a telecommunications network, a wireless local area network (WLAN), such as an intranet, a wide area network (WAN), such as the Internet, or any combination thereof. In some embodiments, network 140 can include wired, wireless, or fiber optic connections. In some embodiments, network 140 can generally be any combination of connections and protocols that will support communications between server device 102, client device 120, storage 130, and any other computing device connected to network 140.

Figure 3:
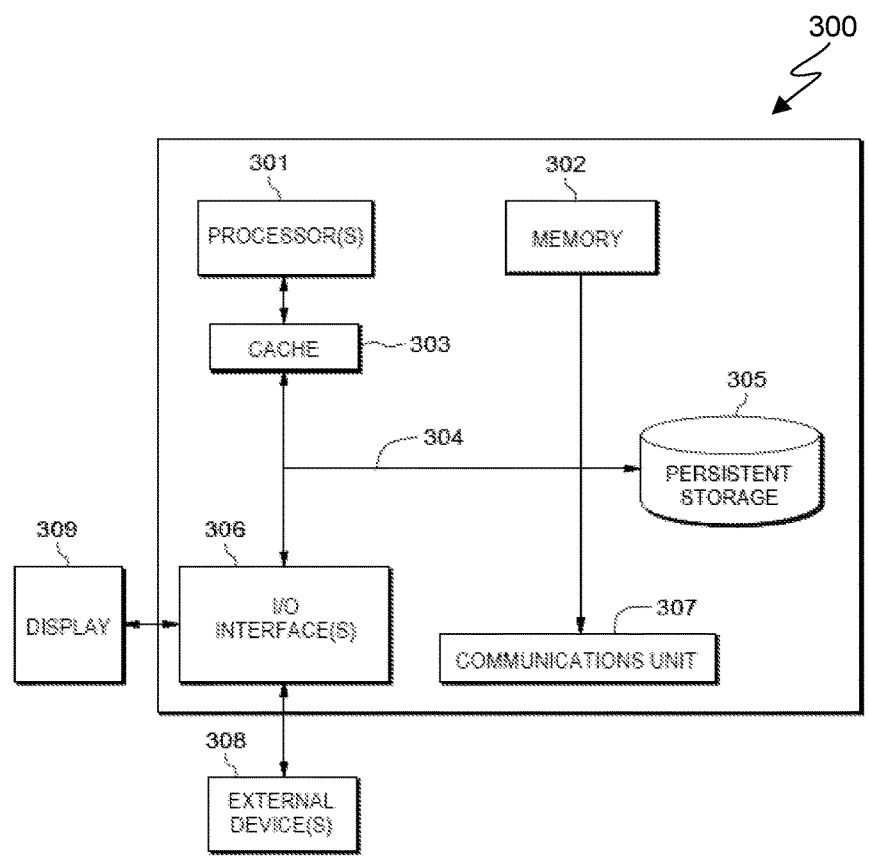
FIG. 3 is a block diagram of components of a computing system, in accordance with an embodiment of the present invention.

In some embodiments, server device 102 can be any electronic device, or combination of electronic devices, capable of executing computer readable program instructions and communicating with any computing device within computing environment 100. For example, server device 102 may be a workstation, personal computer, laptop computer, tablet, personal digital assistant, or mobile phone. In some embodiments, server device 102 can be a computer system utilizing clustered computers and components (e.g., database server computers, application server computers) that act as a single pool of seamless resources when accessed by elements of computing environment 100. For example, server device 102 may be a data center in a cloud computing environment. In some embodiments, server device 102 includes components as depicted and described with respect to computing system 300 (FIG. 3). In some embodiments, client device 120 is substantially similar to server device 102 and includes components as depicted and described with respect to computing system 300.

In some embodiments, storage system 104 manages transmission of data to and from storage 130. In some embodiments, storage system 104 includes Internet protocol suite (TCP/IP) network infrastructure or storage area network (SAN) infrastructure. Storage system 104 protocols can include, for example, Fibre Channel (FC), Fibre Channel over Ethernet (FCoE), ATA over Ethernet (AOE), iSCSI, and HyperSCSI. Storage system 104 includes LPAR 106, storage program 112, hypervisor 114, adapter 116, firmware 118, device driver 110, kernel 122, and storage 130.

In some embodiments, storage 130 includes data organized as one or more data repositories. In some embodiments, a repository is implemented using any non-volatile storage media known in the art. For example, a repository can be implemented with a tape library, optical library, one or more independent hard disk drives or flash drives, or multiple hard disk drives or flash drives in a redundant array of independent disks (RAID). A repository can be implemented using any suitable storage architecture known in the art. For example, a repository can be implemented as a relational database or an object-oriented database.

In some embodiments, storage 130 is partitioned by hardware or software to provide one or more storage subsystems. For example, storage 130 can represent multiple virtual storage area networks (VSANs). The use of VSANs allows for isolation of traffic within specific portions of storage system 104. For example, if a problem occurs in one VSAN, the problem can be handled with minimal disruption to the rest of storage system 104. VSANs are enabled for various high-level protocols such as FCP, FLIP, FICON®, and iSCSI. In some embodiments, each VSAN is configured separately and independently. Each VSAN is a separate self-contained fabric using distinct security policies, zones, events, memberships, and name services.

In some embodiments, storage 130 is connected to server device 102 and storage system 104 through network 140 and a network device (not shown), such as an Ethernet port and adapter, network interface card (NIC), a host bus adapter (HBA), or a converged network adapter (CNA).

In some embodiments, adapter 116 is a hardware device, such as a circuit board or integrated circuit adapter, that connects server device 102 and storage system 104 to network 140. For example, adapter 116 may be a host bus adapter (HBA). In alternative embodiments, adapter 116 is a network interface card (NIC) or a converged network adapter (CNA). In further alternative embodiments, adapter 116 represents any other networking device that provides a communicative interface between storage system 104 and another computing device. For example, adapter 116 may represent a repeater, a modem, a bridge, a hub, a switch, or a router.

In some embodiments, firmware 118 is software embedded in adapter 116 that provides control of, or data manipulation in, adapter 116. In some embodiments, firmware 118 monitors, or listens to, traffic from network 140 attempting to connect to storage system 104 through adapter 116. In some embodiments, traffic includes data in the form of data packets. A data packet, or packet, is a unit of data organized as a single package. A packet includes parameters (packet parameters) such as the source port, the source Internet Protocol (IP) address, the destination port, the destination IP address, and the protocol used by the packet. In some embodiments, the packet parameters of a packet are located in the header of the packet.

In some embodiments, firmware 118 includes a traffic filter that includes a defined list (filter rules) of port numbers or protocols that are allowed to be, or are blocked from being, transmitted from storage system 104, e.g., through adapter 116. In some embodiments, in response to adapter 116 receiving a packet, firmware 118 analyzes the header of the packet and determines the packet parameters. Firmware 118 compares the packet parameters of the packet with the filter rules, i.e., the protocols or ports defined to as allowed or blocked. If the packet parameters are consistent with the filter, the packet is allowed to be transmitted through adapter 116. If the packet parameters are inconsistent with the filter, storage system 104 drops, or rejects, the packet, and any memory (i.e., on the hardware of server device 102) utilized by the packet is marked as available, i.e., the utilized memory can be overwritten by another packet.

In some embodiments, storage system 104 includes one or more partitions that include logical partition (LPAR) 106. In some embodiments, hypervisor 114 creates LPAR 106 from virtual and physical resources of server device 102. In some embodiments, each logical partition runs an independent operating environment, including an operating system (OS) (guest OS). In some embodiments, a virtual machine (VM) represents the guest OS and the resources of server device 102 allocated to LPAR 106 by hypervisor 114.

In some embodiments, the guest OS is an instance, or configuration, of the host OS (i.e., kernel 122) of storage system 104. In addition to providing operating functions for storage system 104, kernel 122 implements the virtual operating environment of LPAR 106. In some such embodiments, kernel 122 and storage program 112 are located in the guest OS of LPAR 106. In alternative embodiments, the guest OS is a distinct OS from kernel 122. In some such embodiments, the guest OS operates in conjunction with kernel 122.

In some embodiments, LPAR 106 includes a virtual I/O server (VIOS). A VIOS is a computer program in a logical partition that enables multiple logical partitions to share access to a physical I/O resource where only one of the logical partitions owns the resource. For example, a VIOS can enable multiple logical partitions to share access to a single hardware device, such as a SCSI adapter and SCSI disk.

In some embodiments, LPAR 106 includes one or more virtual adapters (not shown) to facilitate communications between a VM of LPAR 106 and a VM of another logical partition, or between a VM of a logical partition and other systems of storage system 104. Examples of virtual adapters include virtualized network interface cards (vNICs), virtual host bus adapters (vHBAs), virtual Ethernet adapters, virtual Fibre Channel (FC) adapters, virtual small computer serial interface (SCSI) adapters, and virtual serial adapters.

In some embodiments, hypervisor 114 is a computer program that manages virtual (including paravirtual) operations of storage system 104. In some embodiments, hypervisor 114 manages execution of guest OSs of VMs. As an example, hypervisor 114 manages access to resources of storage system 104 by the VMs. In some embodiments, storage system 104 includes an operating system (host OS), which includes kernel 122, that is distinct from hypervisor 114. Hypervisor 114 loads and operates on top of the host OS. In alternative embodiments, hypervisor 114 includes kernel 122, which does not operate independently from hypervisor 114. Hypervisor 114 performs operating system functions for storage system 104 by directly communicating with physical resources of storage system 104 (e.g., to allocate resources to LPAR 106).

In some embodiments, hypervisor 114 manages communications within storage system 104, and communications between storage system 104 and server device 102, through a communications fabric. For example, hypervisor 114 can manage a resource request from a guest OS of LPAR 106 through communications fabric 304, which is further described with respect to FIG. 3. In some embodiments, hypervisor 114 manages communications between logical partitions, and communications between a logical partition and other systems of storage system 104, through one or more virtual switches (not shown). In some embodiments, a virtual switch is a computer program that facilitates the transmission of data packets between components of storage system 104. For example, a virtual switch can provide connectivity between LPAR 106 (i.e., a virtual adapter of LPAR 106) and adapter 116. In some embodiments, virtual switches are represented by hypervisor 114. In alternative embodiments, virtual switches are represented by communications fabric 304.

In some embodiments, the communications fabric is a communications subsystem of storage system 104. For example, the communications fabric can be configured as a Virtual Local Area Network (VLAN). In some embodiments, the communications fabric is embedded in virtualization software of storage system 104. In alternative embodiments, the communications fabric is included in the hardware components of server device 102 as firmware. In some embodiments, the communications fabric includes a combination of physical and virtualized resources, such as fiber optic cables, Ethernet cables, physical and virtual adapters, and wireless connections.

In some embodiments, device driver 110 is a computer program, application, or subprogram of a larger program that provides an interface to one or more hardware components of storage system 104. For example, device driver 110 provides an interface that enables hypervisor 114, kernel 122, and storage program 112 to communicate with firmware 118 and adapter 116. For example, device driver 110 provides access to the packet filter of firmware 118 and thereby control of the network traffic filtering function of adapter 116. In some embodiments, device driver 110 communicates with devices (e.g., adapter 116) and other programs (e.g., firmware 118) of storage system 104 through the communications fabric. In some embodiments, device driver 110 is run by hypervisor 114. In alternative embodiments, device driver 110 is run by kernel 122, which can be located in LPAR 106 or, alternatively, outside of LPAR 106.

In some embodiments, storage program 112 is a computer program, application, subprogram of a larger program, such as an OS, or a combination thereof, that manages access to storage system 104, including storage 130, by incoming network traffic. In some embodiments, in response to a request to update, replace, or otherwise modify the filter rules (i.e., the allowed or blocked ports or network protocols) of firmware 118, device driver 110, or kernel 122, storage program 112 prompts the requestor for a cryptographic key or password and allows the action only if the cryptographic key or password is provided. In some embodiments, storage program 112 allows kernel 122 to load a driver of a networking device (e.g., a driver that facilitates communications with firmware 118) only if the driver is cryptographically signed (e.g., a key or password is provided). In some embodiments, storage program 112 periodically inspects or queries device driver 110, firmware 118, hypervisor 114, and kernel 122 to determine if a modification has been made to the filter rules. If storage program 112 determines that a modification has been made, storage system 104 takes a responsive action, e.g., raises an event.

In some embodiments, storage program 112 runs directly on server device 102. In alternative embodiments, storage program 112 runs on a VM of LPAR 106. In some such embodiments where storage program 112 runs on a VM, the VM utilizes a para-virtualized device driver 110, which runs on hypervisor 114. In other such embodiments where storage program 112 runs on a VM, the VM utilizes a virtualized or emulated device, which runs on hypervisor 114 and includes an implementation of the logic further described with respect to FIG. 2.

In some embodiments, where storage program 112 is not running on a VM of LPAR 106, or where further security is desired, adapter 116 and firmware 118 include code that prevents altering firmware 118 without cryptographic signing. This prevents a user from replacing firmware 118 with a version of firmware that does not implement some or all of the restrictions further described with respect to FIG. 2.

Figure 2:
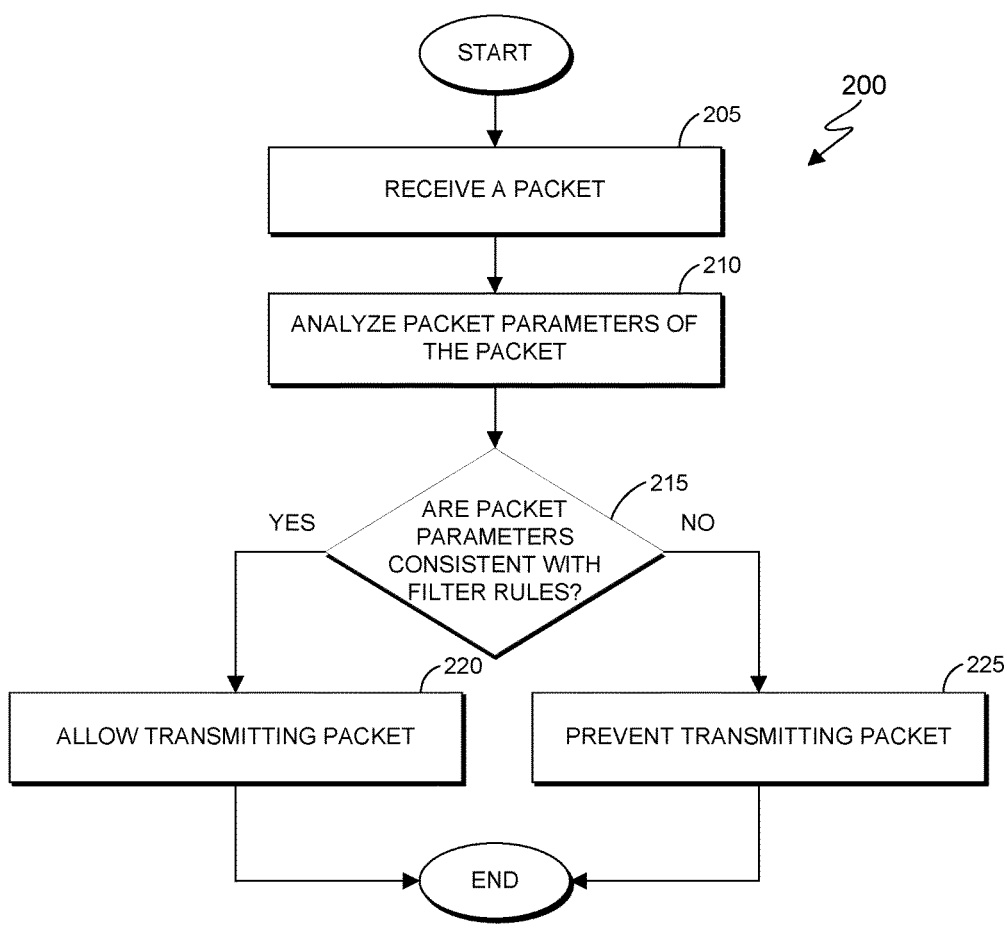
FIG. 2 depicts a flowchart of the operational blocks of a program for providing security in a computer storage system, in accordance with an embodiment of the present invention.

In further embodiments, logic and restrictions further described with respect to FIG. 2 are implemented in kernel 122 of the operating system running the storage program 112. In some such embodiments, a kernel image is cryptographically signed and a boot loader, on server 102, prevents loading a version of kernel 122 that is not signed. In alternative embodiments, logic and restrictions further described with respect to FIG. 2 are implemented in device driver 110. In some such embodiments, kernel 122 requires driver 110 to be cryptographically signed and prevents loading a version of device driver 110 that is not signed.

FIG. 2 is a flowchart of workflow 200 depicting operational steps for providing security for a networked storage system, in accordance with embodiments of the present invention. In some embodiments, workflow 200 is performed by storage system 104. For example, various aspects of workflow 200 can be performed by storage program 112, hypervisor 114, firmware 118, device driver 110, or kernel 122. In alternative embodiments, workflow 200 is performed by any other computer program while working with storage system 104. In some embodiments, storage system 104 begins performing workflow 200 in response to receiving an indication by a user of storage system 104, client device 120, or any other computing device connected to network 140. In alternative embodiments, workflow 200 initiates in response to a boot, or reboot, of storage system 104.

In step 205, storage system 104 receives a packet. In some embodiments, storage system 104 receives a packet at adapter 116 from client device 120 through network 140. For example, storage system 104 can receive a request from client device 120 to access port 23, or Telnet protocol, in order to manage a network device in storage system 104. Storage system 104 can receive the request as a stream of multiple packets at adapter 116.

In some embodiments, storage system 104 is a virtual environment, and storage hypervisor 114 or kernel 122 receives a packet from a guest OS running in LPAR 106. In some embodiments, a guest OS in LPAR 106 requires para-virtualization. In some paravirtualized environments, paravirtualized device driver 110 can run on hypervisor 114 and receive a packet from the guest OS. In alternative embodiments, the environment is fully virtualized. In some virtualized environments, device driver 110 can be located in kernel 122, and kernel 122 and device driver 110 can be emulated by hypervisor 114. In such embodiments, the device corresponding to device driver 110 (e.g., adapter 116) does not appear virtualized to the guest OS.

In step 210, storage system 104 analyzes packet parameters of the packet. In some embodiments, packet parameters include the source port, the source Internet Protocol (IP) address, the destination port, the destination IP address, or the protocol. In some embodiments, packet parameters are located in the header of each packet. In some embodiments, storage system 104 analyzes the packet parameters of the packet in response to adapter 116 receiving the packet. In response to adapter 116 receiving the packet at adapter 116 through network 140, firmware 118 identifies the packet parameters of the packet.

In some embodiments, kernel 122 or hypervisor 114 receive the packet. For example, when a logical partition is running a guest OS, hypervisor 114 can receive the packet and transfer the packet to device driver 110. In some embodiments, storage system 104 includes a distinct host OS and device driver is located in kernel 122. In alternative embodiments, hypervisor 114 performs OS functions for storage system 104 and device driver is located in hypervisor 114. In response to receiving a packet, device driver 110 identifies the packet parameters of the packet.

In decision step 215, storage system 104 determines whether the analyzed packet parameters are consistent with filter rules. In some embodiments, filter rules include an exhaustive list of port numbers or protocols that are allowed to be accessed within storage system 104 (e.g., a whitelist). For example, the filter in firmware 118 might define only port 3260 as an allowed port, or only TCP connections on the iSCSI protocol. In some embodiments, filter rules additionally or alternatively include a defined list of port numbers or protocols that are blocked from being accessed within storage system 104 (e.g., a blacklist). For example, a filter in kernel 122 might define the Fibre Channel over IP (FCIP) protocol, or port 3225, as a blocked port.

In some embodiments, storage system 104 compares the analyzed packet parameters of the packet with the filter rules. The packet parameters are consistent with the filter if the parameters appear on a defined whitelist, if any is defined in the filter, and the parameters do not appear on a defined blacklist, if any is defined in the filter.

In some embodiments, a filter is hard-coded in firmware 118, device driver 110, or kernel 122. For example, a filter is embedded in the source code of firmware 118, and the filter can only be modified if the source code of firmware 118 is modified. In alternative embodiments, storage system 104 includes more than one filter, and a filter is hard-coded in a combination of firmware 118, device driver 110, and kernel 122. For example, firmware 118, device driver 110, and kernel 122 may each include a defined list of ports that are allowed to be accessed within storage system 104.

In some embodiments, storage program 112 provides cryptographic protection within storage system 104. In some embodiments, in response to an attempt to update, replace, or otherwise modify filter rules of firmware 118, device driver 110, or kernel 122, storage program 112 prompts the requestor for a cryptographic key or password and allows the access only if the key or password is provided. In some embodiments, storage program 112 allows kernel 122 to load a new driver of a networking device only if the new driver is cryptographically signed, i.e., a cryptographic key or password is provided. A user that has privileged access to storage system 104, e.g., through a guest OS running on LPAR 106 of storage system 104, is thereby prevented from utilizing the privileged access to disable a filter, unless the user provides the key or password. In some embodiments, storage program 112 inspects firmware 118, device driver 110, or kernel 122 at periodic intervals to determine if the packet filter rules have been modified.

In step 220, responsive to determining that the analyzed packet parameters are consistent with the filter (Yes branch, decision step 215), storage system 104 allows the packet to be transmitted to a requested destination. In step 225, responsive to determining that the analyzed packet parameters are not consistent with the filter, (No branch, decision step 215), storage system 104 prevents the packet from being transmitted to the requested destination and drops, or rejects, the packet. In some embodiments, any memory (i.e., on the hardware of server device 102) utilized by the dropped packet is marked as available, i.e., the utilized memory can be overwritten by another packet.

FIG. 3 depicts computing system 300, which illustrates components of server device 102 and client device 120. Computing system 300 includes processor(s) 301, cache 303, memory 302, persistent storage 305, communications unit 307, 110 interface(s) 306, and communications fabric 304.

Communications fabric 304 provides communications between cache 303, memory 302, persistent storage 305, communications unit 307, and I/O interface(s) 306. Communications fabric 304 can be implemented with any architecture designed for passing data and/or control information between processors (e.g., microprocessors, communications and network processors, etc.), system memory, peripheral devices, and any other hardware components within a system. For example, communications fabric 304 may be implemented with one or more buses or a crossbar switch.

Memory 302 and persistent storage 305 are computer readable storage media. In some embodiments, memory 302 includes random access memory (RAM) (not shown). In general, memory 302 may include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In some embodiments, persistent storage 305 includes a magnetic hard disk drive. Alternatively, or in addition to a magnetic hard disk drive, persistent storage 305 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 through I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

What is claimed is:

1. A method comprising:

creating, by one or more processors of a network adapter of a storage system, a set of filter rules, wherein the set of filter rules is located in a firmware that is included on the network adapter, and wherein the set of filter rules includes a list of port numbers and protocols that are allowed or blocked from being accessed within the storage system;

responsive to receiving a request to modify the set of filter rules, prompting, by one or more processors of the network adapter, a requestor for a cryptographic key, wherein the requestor has privileged access to a guest operating system running on the storage system only if the cryptographic key is provided;

receiving, by one or more processors of the network adapter, a first packet;

analyzing, by one or more processors of the network adapter, a header of the first packet to determine a set of packet parameters, wherein the set of packet parameters includes a set of ports and protocols;

determining, by one or more processors of the network adapter, that the set of packet parameters of the received first packet is consistent with a rule in the set of filter rules;

in response to determining that the set of packet parameters of the received first packet is consistent with a rule in the set of filter rules, transmitting, by one or more processors of the network adapter, the received first packet through the network adapter;

receiving, by one or more processors of the network adapter, a second packet;

analyzing, by one or more processors of the network adapter, a header of the second packet to determine a set of packet parameters, wherein the set of packet parameters includes a set of ports and protocols;

determining, by one or more processors of the network adapter, that the set of packet parameters of the received second packet is inconsistent with the set of filter rules; and in response to determining that the set of packet parameters of the received second packet is inconsistent with the set of filter rules, dropping, by one or more processors of the network adapter, the received second packet to prevent transmission through the network adapter.

* * * * *